United States Patent [19]

Martin et al.

[11] Patent Number: 4,994,997
[45] Date of Patent: Feb. 19, 1991

[54] PIPELINE-TYPE SERIAL MULTIPLIER CIRCUIT

[75] Inventors: Philippe Martin, Fresnes; Thierry Bonnet, Champigny; Yves Mathieu, Boulogne, all of France

[73] Assignee: U.S. Philips Corporation, New York, N.Y.

[21] Appl. No.: 245,887

[22] Filed: Sep. 16, 1988

[30] Foreign Application Priority Data

Sep. 25, 1987 [FR] France .................. 87 13291

[51] Int. Cl.⁵ .............................................. G06F 7/52
[52] U.S. Cl. ................................................. 364/759
[58] Field of Search ............... 364/759, 754, 757, 760

[56] References Cited

U.S. PATENT DOCUMENTS 4,799,182 1/1989 Marwood ......................... 364/748

FOREIGN PATENT DOCUMENTS 2166272 4/1986 United Kingdom .

OTHER PUBLICATIONS

N. F. Benschop et al., *Compact NMOS Array Multipliers with Inverting Full Adders*, Philips J. Res., vol. 36, pp. 173-194, (1981).

*Primary Examiner*—Dale M. Shaw
*Assistant Examiner*—Tan V. Mai
*Attorney, Agent, or Firm*—Anne E. Barschall

[57] ABSTRACT

A pipeline-type serial multiplier having a cellular structure, each cell comprising an adder which operates on 3 one-bit data x, y, c and which determines the result v modulo 2 and the carry $c_o$ of the addition of x, y, and c. Each adder simultaneously determines a data $c_1$ which is the modulo 2 result of the addition of x, y, $c_o$. This enables the exact final result of a multiplication of a data A of n bits by a data B of p bits to be obtained in two successive segments: a segment L which is formed by the p bits of lowest digital weight and a segment H which is formed by the n bits of the highest weight. The output rate is F/n, where F is the clock frequency. The multiplier circuits can be cascaded under the control of an external signal. They can also be connected in parallel in order to add the results of two multiplications.

18 Claims, 4 Drawing Sheets

PIPELINE-TYPE SERIAL MULTIPLIER CIRCUIT

BACKGROUND OF THE INVENTION

1. Field of the Invention

The invention relates to a pipeline-type serial multiplier circuit having a cellular structure for multiplying two synchronized streams of digital data, that is to say a stream A consisting of n bits $[a_n \ldots a_k \ldots a_1]$ and a stream B consisting of p bits $[b_p \ldots b_k \ldots b_1]$, where n, k and p are integers, by forming in each cell of the structure, in the pipeline mode, the partial products of the multiplicand A and each bit of the multiplier B, after which they are successively added at a clock frequency F, each cell of the order k comprising:

an elementary one-bit adder which receives the data $x_k$, $y_k$ and the carries $c_k$, and which at a given instant outputs a result $v_k$ and a carry $c_{ok}$, so that $$v_k = (x_k \,\&\, y_k \,\&\, c_k) \text{ modulo } 2$$

$$c_{ok} = (x_k \,\&\, y_k \,\&\, c_k)/2,$$

where $c_k$ is at a given instant equal to the data $c_{ok}$ determined in the same cell during the previous clock period, after which it is delayed so that $c_k = c_{ok}(d)$, delay means for synchronizing the data delivered by two successive cells, and means for the temporary storage of a data bit and the carry $c_{ok}$.

For performing the serial multiplication of two digital data, each bit of one of the data is stored in the cells of a multiplier circuit; these bits are multiplied by the bits of the second data in order to produce partial products which are added according to their binary weight.

2. Related Art

A multiplier circuit of this kind is known from GB No. 2 166 272A which describes a serial multiplier circuit which operates on signed data and which, using an external flag, renders the multiplier circuit cascadable when the number of bits of the input data is to be extended.

However, the cited document describes only the execution of truncated multiplications: only the most-significant part of the result is delivered. The result, therefore, is an approximation. Thus, a first problem to be solved for given applications consists in that the exact result of the operation must become available, however, without increasing the calculation time.

SUMMARY OF THE INVENTION

This problem is solved in accordance with the invention in that the multiplier circuit comprises means for delivering the exact result of the operation in two consecutive bit segments under the control of a signal R, first of all, with $n > p$, a segment L which is formed by the p bits having the lowest binary weight, followed by a segment H which is formed by the n bits having the highest binary weight, the multiplier circuit having an output rate F/n, which means comprise:

means for generating, after the temporary storage, a data $c_{1k}$ such that:

$c_{1k} = (x_k \,\&\, y_k \,\&\, c_{ok})$ modulo 2,
the data $c_{1k}$ being delivered during the same clock period as the data $c_{ok}$, and means for determining the partial segments $L_k$ and $H_k$ supplied by each cell of the order k so that:

$$L_k = L_{k-1}(d) \cdot R_{k-1}(d) + v_k \cdot \overline{R_{k-1}(d)} \text{ and}$$

$$H_k = v_k \cdot R_{k-1}(d) + c_{1k}(d) \cdot \overline{R_{k-1}(d)}$$

where $R_{k-1}(d)$ is the signal $R_{k-1}$ applied to the cell k via the preceding cells, delayed by one clock period in the cell k, the reintroduction of the carry $c_k$ in the adder of the order k being controlled by the signal $R_{k-1}(d)$ in accordance with $c_k = c_{ok}(d) \cdot R_{k-1}(d)$ for the $p-1^{th}$ cells and $c_p = b_p \cdot \overline{R_{p-1}(d)} + R_{p-1}(d) \cdot c_{op}(d)$ for the $p^{th}$ cell, $c_{1k}(d)$ being the data $c_{1k}$ delayed by one clock period in the $k^{th}$ cell, the $p-1^{th}$ cells performing on the data A and B the operations of the type $A \cdot b_k$ and the $p^{th}$ cell performing an operation of the type $\overline{A} \cdot b_p$, the symbols used being:

(.): AND-logic; (+): OR-logic; (×): multiplication; (&): addition.

A secondary technical problem to be solved concerns the cascadability of two multiplier circuits. To this end, the $p^{th}$ cell is modified and comprises means for determining the carry $c_p$ entering the $p^{th}$ adder according to: $c_p = F \cdot b_p \cdot \overline{R_{p-1}(d)} + R_{p-1}(d) \cdot c_{op}(d)$ and for performing the operation of the type $(A \times F) \cdot b_p$, where (×) represents the exclusive-OR function and where F is a signal enabling control of the $p^{th}$ cell in order to obtain a cascadable multiplier circuit. Thus, a chain of several multiplier circuits can be realized in order to form a multiplier structure.

Another secondary technical problem concerns the parallel connection of several multiplier circuits in order to perform an operation such as the addition of the results of two multiplications: $(A \times B) \,\&\, (C \times D)$ and still supply the exact result. To achieve this, the invention allows for the realization of a multiplier structure which comprises a parallel connection of two multiplier circuits or two chains of multiplier circuits which simultaneously deliver their two segments $L_1$ and $L_2$ as well as their two segments $H_1$ and $H_2$, the segments $L_1$ and $L_2$ being added in a first adder, the segments $H_1$ and $H_2$ and the carry of the first adder being added in a second adder, one of the adders supplying the part corresponding to the bits of the lowest binary weight and while the other adder supplies the part corresponding to the bits of the highest binary weight of the overall result.

The n-bit data A and the p-bit data B can be processed. Preferably, for $n > p$, the multiplier circuit will comprise a number of cells equal to the smallest number of p bits of any of the input data in order to obtain a compact multiplier circuit.

For the following equations use is made of the customary algebraic symbols, that is to say: (.): multiplication; (+): addition; (−): subtraction.

Assume that two binary numbers A and B are formed by the following bit sequences:

$$A = [a_n \ldots a_k \ldots a_1]$$

and $$B = [b_p \ldots b_k \ldots b_1].$$

If these binary numbers are negative, they are represented in two's complement notation in the customary manner. The multiplication of A by B is a number coded on (n+p) bits:

$$p_{np} = A \cdot B = \sum_{k=1}^{p-1} A \cdot b_k \cdot 2^{k-1} - A \cdot b_p \cdot 2^{p-1}$$

The partial products are defined:

$$P(o) = o \tag{1}$$

$$P(k) = P(k-1) + A \cdot b_k \cdot 2^{k-1} \text{ for } 1 \leq k < p \text{ and}$$

$$P(p) = P(p-1) - A \cdot b_p \cdot 2^{p-1} \text{ for } k = p$$

The products P(k) are sequences of binary numbers which can be written as:

$$P(k) = [P_{n+k} \ldots P_k \ldots P_1]. \tag{2}$$

This sequence can be decomposed into two terms for each cell of the order k:

$$L(k) = [P_k \ldots P_1] \tag{3}$$

and $$H(k) = [P_{n+k} \ldots P_{k+1}], \tag{4}$$

where $L_k$ corresponds to a non-signed term and $H_k$ corresponds to a signed term.

The term P(k) is written as:

$$P(k) = H(k) \cdot 2^k + L(k). \tag{5}$$

Similarly, on the basis of the preceding term P(k−1) the term P(k) is written as:

$$P(k) = P(k-1) + A \cdot b_k \cdot 2^{k-1} \tag{6}$$

that is to say:

$$P(k) = (H(k-1) + A \cdot b_k) \cdot 2^{k-1} + L(k-1). \tag{7}$$

The term $H(k-1) + A \cdot b_k$ is a binary sequence $S = [s_{n+1} \ldots s_1]$ which can be expressed by $$S = H(k-1) + A \cdot b_k = \sum_{i=1}^{n} s_i \cdot 2^{i-1} - s_{n+1} \cdot 2^n \tag{8}$$

or $$P(k) = \left(\sum_{i=1}^{n} s_i \cdot 2^{i-1} - s_{n+1} \cdot 2^n\right) \cdot 2^{k-1} + L(k-1). \tag{9}$$

By comparison with (5) it can be deduced that $$H(k) = [s_{n+1} \ldots s_2] \text{ and}$$

$$L(k) = L(k-1) + s_1 \cdot 2^{k-1}.$$

Thus, the determination of the term $H(k-1) + A \cdot b_k$ enables the determination of the sequence S, the most-significant bits of which constitute the term H(k) of the cell of the order k, the term L(k) being derived from the term L(k−1) by addition of the least-significant bit $s_1$, weighted by the coefficient $2^{k-1}$. This process is performed in each cell of the order k. For the first cell the terms H(0) and L(0) are zero. The terms $L_1, L_2, \ldots L_p$ are successively determined in the cells of the order 1, 2, ... p and appear in this order on the output of the $p^{th}$ cell on the connection associated with L. Simultaneously with the determination of the terms $L_1 \ldots L_p$, the multiplier circuit determines the terms $H_1 \ldots H_p$ which appear on the connection associated with H on the output of the multiplier circuit when the output of the terms $L_1$ to $L_p$ is terminated. Thus, the two segments L and H of the final result appear, successively on the output.

BRIEF DESCRIPTION OF THE FIGURES

The invention will be described in detail hereinafter with reference to the accompanying drawings. Therein.

DETAILED DESCRIPTION OF THE PREFERRED EMBODIMENTS

The following symbols are used: (.): AND-logic; (+): OR-logic; (×): multiplication; (&): addition; (x): exclusive-OR; (−): inversion.

Figure 1A:
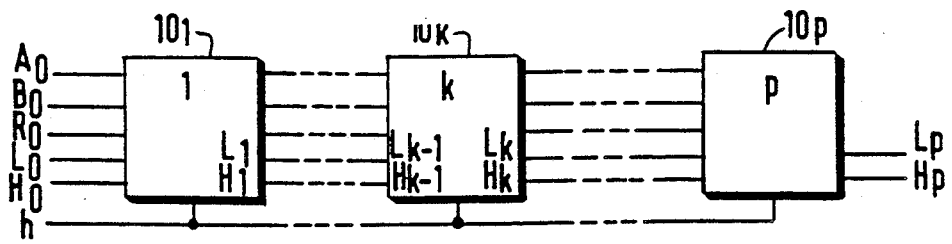
FIG. 1A is a diagram of the cellular structure of the pipeline-type serial multiplier circuit in accordance with the invention, comprising p cells for a multiplication n×p, where n>p.

FIG. 1A is a diagram illustrating the cellular structure of the pipeline-type serial multiplier circuit in accordance with the invention. The multiplier circuit comprises cells $10_1, \ldots 10_k \ldots 10_p$. The cells comprise 5 inputs and a clock input h for the synchronization of the operations. The clock is distributed across all cells.

The inputs A and B serve to receive the data $[a_n \ldots a_1]$ and $[b_p \ldots b_1]$, respectively, to be multiplied. Both data enter with the least-significant bit at the front. A control signal R enables control of the exchanges between the various cells and inside the cells themselves. The inputs L and H receive the values from the preceding stage. In the case of the first cell, these values are set to zero. However, the input H can receive non-zero values when a constant is to be added.

The cell 1 transmits to the cell 2 the data introduced on A, B and R with a delay. It also transmits the values $L_1$ and $H_1$ it has calculated. This process continues until the $p^{th}$ cell which supplies the final result, i.e. first Lp and then Hp.

Figure 1B:
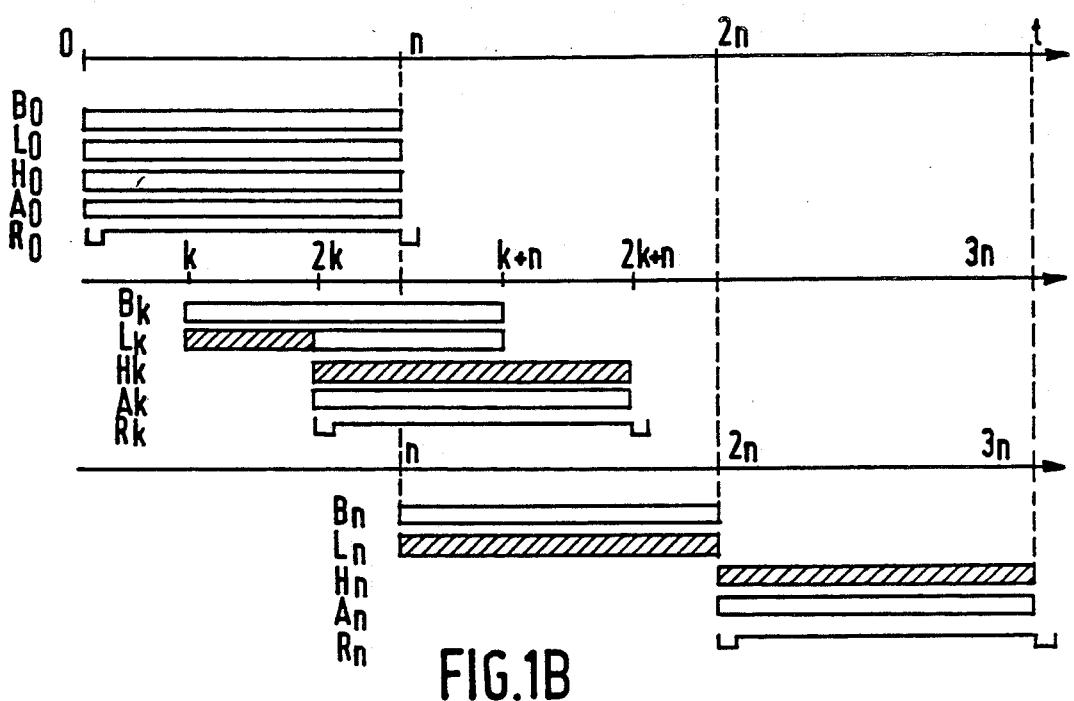
FIG. 1B is a time diagram relating to an n×n bit multiplication.

FIG. 1B shows the time diagram of the operations for n cells, in the case where the data A and B both have a length of n bits. All cells operate for a period of time which is equal to n times the fundamental clock period having a duration h. The first cell operates as from the initial instant; the $k^{th}$ cell starts to operate after a delay amounting to $(k-1) \times h$ and the $n^{th}$ cell starts to operate after a delay amounting to $(n-1) \times h$. The cell k delivers the first bit of its term $L_k$ at the instant k, and delivers the first bit of its term $H_k$ at the instant 2k.

Similarly, the cell n delivers the first bit of its term $L_n$ at the instant n and the first bit of its term $H_n$ at the instant 2n.

Figure 1C:
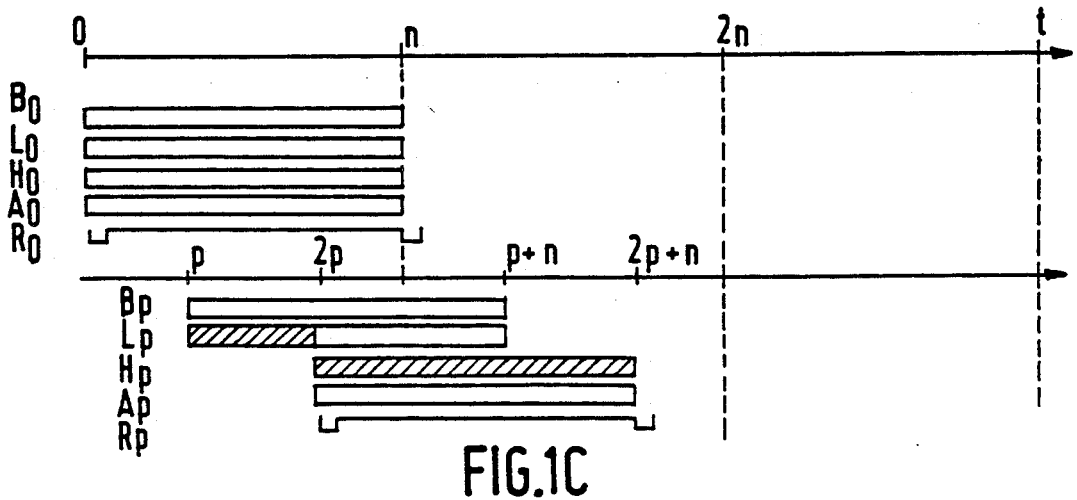
FIG. 1C is a time diagram relating to the structure of FIG. 1A.

FIG. 1C is the time diagram of these operations for p cells for the data A consisting of n bits and the data B consisting of p bits. This corresponds to the case shown in FIG. 1B where k=p.

At the instant p the cell p delivers the first bit of its term $L_p$; it delivers the first bit of its term $H_p$ at the instant 2p.

Figure 2:
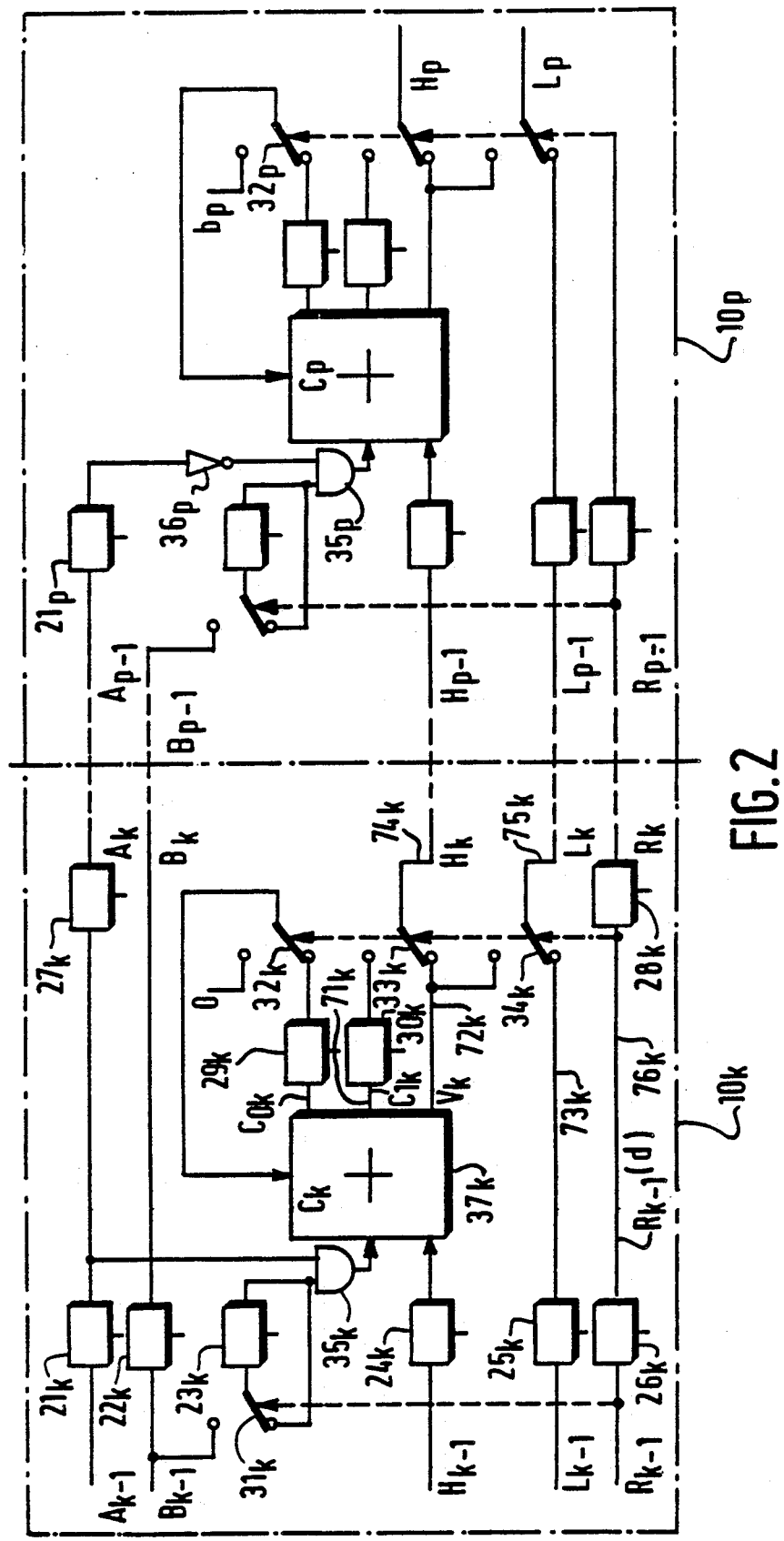
FIG. 2 is a logic diagram illustrating a cell of the order k, where $1 \leq k < p$, and the last cell of the order p.

FIG. 2 is a logic diagram showing the cell $10_k$ of the order k ($1 \leq k < p$) and the last cell $10_p$ of the order p.

The cell $10_k$ comprises the following elements:
- a flipflop $21k$ which is followed by a flipflop $27_k$ for delaying the data $A_{k-1}$
- a flipflop $22_k$ for delaying the data $B_{k-1}$
- a flipflop $24_k$ for delaying the data $H_{k-1}$
- a flipflop $25_k$ for delaying the data $L_{k-1}$
- a flipflop $26_k$ which is followed by a flipflop $28_k$ for delaying the signals $R_{k-1}$
- a selector $31_k$ which fetches, under the control of the signal $R_{k-1}$, the $k^{th}$ bit of the data B, that is to say $b_k$. The latter is stored in the flipflop $23_k$ for a period $n \times h$ in order to be used by the cell k. The output of the flipflop $23_k$ and that of the flipflop $21_k$ enter an AND-gate $35_k$ in order to perform the multiplication of the bit $b_k$ by $[a_n \ldots a_1]$. All flipflops are controlled by the clock h.

Each cell $10_k$ comprises an adder $37_k$. This is a 1-bit adder having 3 inputs and 3 outputs. When the bit present on each input is referred to as x, y, r, respectively and the bit present on each output is referred to as v, $c_0$, $c_1$, respectively, the result delivered by the adder can be expressed in general by the following logic equations:

if $x \times y = 1$, $v = \bar{r}$, $c_o = r$ and $c_1 = \bar{r}$ if $x \times y = 0$, $v = r$, $c_o = x$ and $c_1 = x$ where the symbol ($\times$) represents the exclusive-OR operation and the symbol ($-$) represents the inversion operation.

In the adder $37_k$ the output of the AND-gate $35_k$ is added to the output of the flipflop $24_k$ and to a carry $c_k$ in order to supply the partial result $v_k$. The adder $37_k$ also delivers a carry $c_{ok}$ which is delayed in a flipflop $29_k$. A selector $32_k$ supplies the carry $c_k$ so that:

$c_k = c_{ok}(d).R_{k-1}(d)$.

The adder $37_k$ also supplies the data $c_{1k}$ defined by $c_{1k} = [x_k \& y_k \& c_{ok}]$ modulo 2 in the same clock period as the data $c_{ok}$.

A selector $33_k$ supplies the data $H_k$ so that:

$H_k = v_k.R_{k-1}(d) + c_{1k}(d).\bar{R}_{k-1}(d)$

Similarly a selector $34_k$ supplies the data $L_k$ so that:

$L_k = v_k.\bar{R}_{k-1}(d) + L_{k-1}(d).R_{k-1}(d)$.

Figure 4:
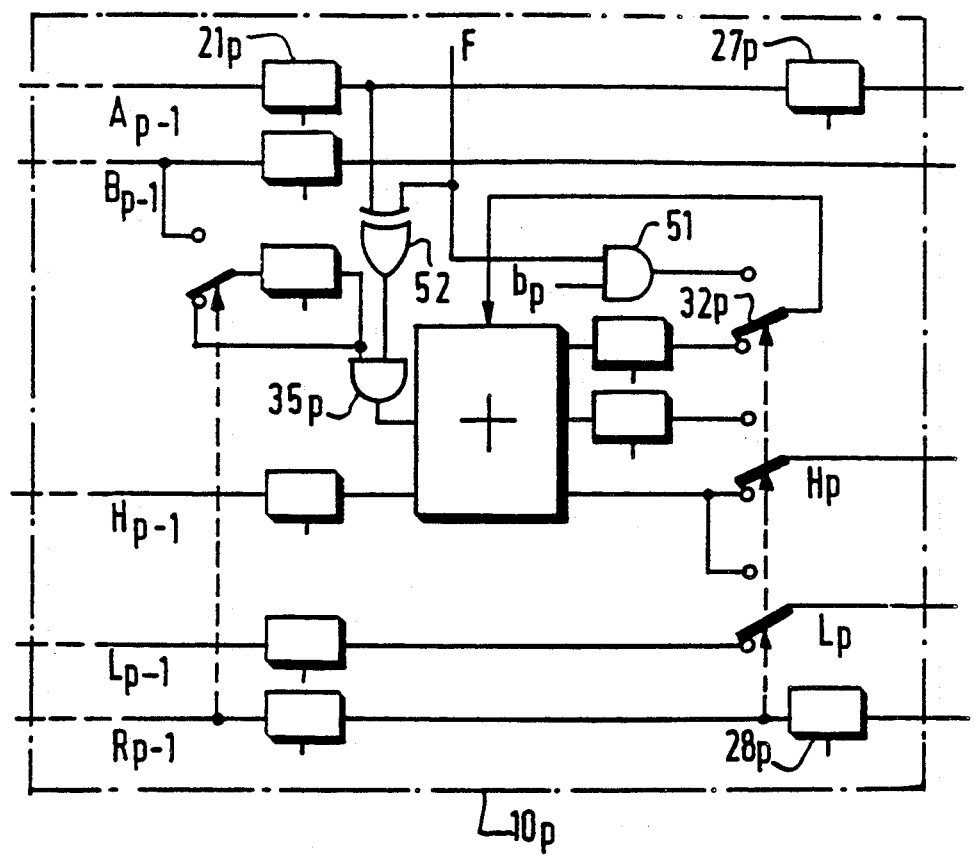
FIG. 4 is a modified diagram of the last cell in order to obtain a cascadable multiplier circuit.

The cell $10_p$ corresponds to cell $10_k$ except for the following. The selector $32_p$ selects the carry $c_p$ so that:

$c_p = \bar{R}_{p-1}(d).b_p + R_{p-1}(d).c_{op}(d)$ the output of the flipflop $21_p$ enters an inverter $36_p$ whose output enters an AND-gate $35_p$.

the flipflops $27_p$ and $22_p$ can be omitted, except when two multiplier circuits are connected in series and the data A and B must be transmitted (see FIG. 4).

The operation mechanism is as follows (given by way of example for four bits contained in the data A and B). The multiplier circuit then comprises 4 cells. At the beginning of the first period, $R_o = 0$.

At the end of the $1^{st}$ period:
The flipflop $21_1$ stores $a_1$
The flipflop $22_1$ stores $b_1$
The flipflop $23_1$ stores $b_1$
The flipflop $24_1$ stores $H(0) = 0$
The flipflop $25_1$ stores $L(0) = 0$
The flipflop $26_1$ switches over to the logic 0-state.

During the $2^{nd}$ period:
The adder $37_1$ starts to operate by calculating $a_1.b_1$ At the end of the $2^{nd}$ period:
The bit $a_1$ has progressed as far as the output of the flipflop $27_1$
The bit $b_1$ has progressed as far as the output of the flipflop $22_2$
The flipflop $23_1$ saves the bit $b_1$
The flipflop $23_2$ is still in the zero state.

At the end of the $3^{rd}$ period:
The bit $a_1$ has progressed as far as the output of the flipflop $21_1$
The bit $b_2$ has progressed as far as the output of the flipflop $22_2$.
The flipflop $23_1$ saves the bit $b_1$
The flipflop $23_2$ stores the bit $b_2$.

During the $4^{th}$ period:
The adder $37_2$ starts to operate by calculating $a_1.b_2$ The calculations in each cell are performed as follows:

| | $1^{st}$ cell | $2^{nd}$ cell | | $3^{rd}$ cell | | $4^{th}$ cell | | |
|---|---|---|---|---|---|---|---|---|
| $1^{st}$ period | 0 | 0 | | 0 | | 0 | | |
| $2^{nd}$ period | $a_1b_1$ | 0 | | 0 | | 0 | | |
| $3^{rd}$ period | $a_2b_1$ | $a_1b_1$ & 0 | | 0 | | 0 | | |
| $4^{th}$ period | $a_3b_1$ | $a_2b_1$ & $a_1b_2$ | | $a_1b_1$ & 0 | | 0 | | |
| $5^{th}$ period | $a_4b_1$ | $a_3b_1$ & $a_2b_2$ | | $a_2b_1$ & $a_1b_2$ & 0 | | $a_1b_1$ | | |
| $6^{th}$ period | 0 | $a_4b_1$ & $a_3b_2$ | | $a_3b_1$ & $a_2b_2$ & $a_1b_3$ | | $a_2b_1$ & $a_1b_2$ | | |
| $7^{th}$ period | 0 | 0 & $a_4b_2$ | | $a_4b_1$ & $a_3b$ & $a_2b_3$ | | $a_3b_1$ & $a_2b_2$ & $a_1b_3$ | | |
| $8^{th}$ period | 0 | 0 | | $a_4b_2$ & $a_3b_3$ | | $a_4b_1$ & $a_3b_2$ & $a_2b_3$ & $a_1b_4$ | | |
| $9^{th}$ period | 0 | 0 | | $a_4b_3$ | | $a_4b_2$ & $a_3b_3$ & $a_2b_4$ | | |
| $10^{th}$ period | 0 | 0 | | 0 | | $a_4b_3$ & $a_3b_4$ | | |
| $11^{th}$ period | 0 | 0 | | 0 | | $a_4b_4$ | | |

Figure 3:
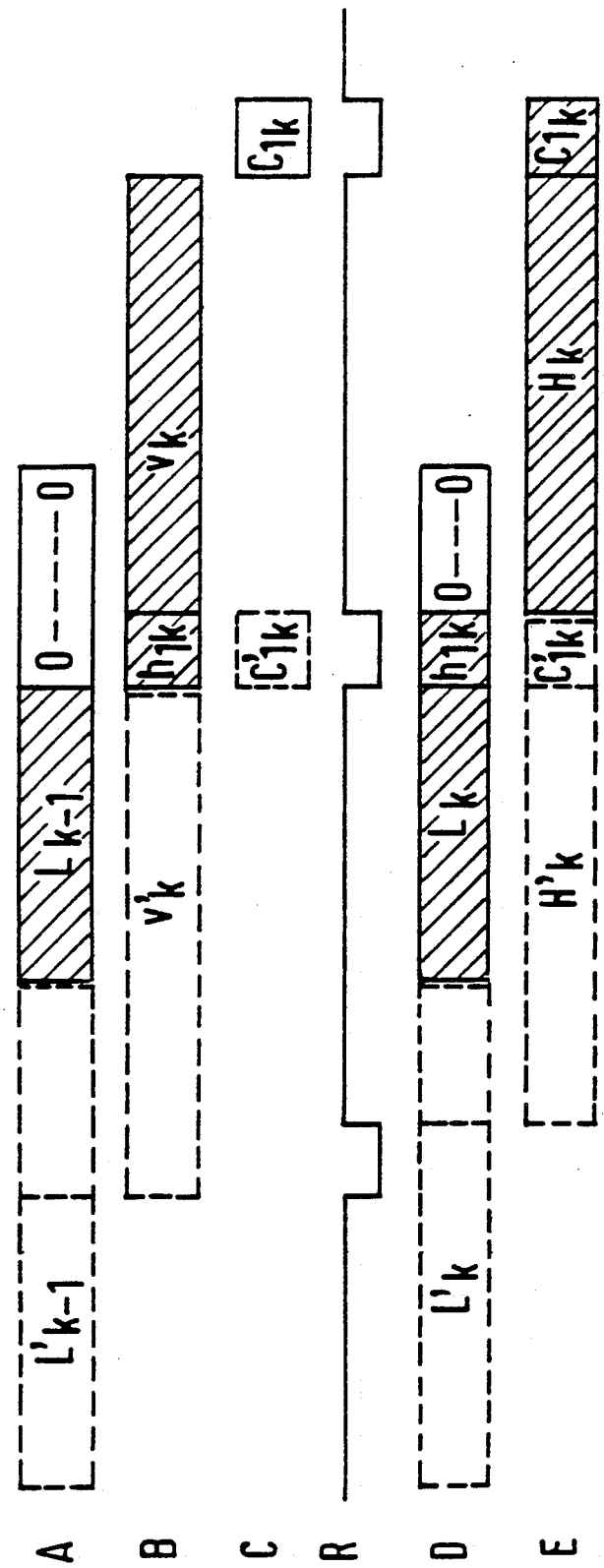
FIG. 3 illustrates the movement of the data in the segments L and H in accordance with the invention.

On the basis of these elementary operations, performed in each cell of the multiplier circuit, the signals $L_k$ and $H_k$ are composed in each cell as follows. The situation is shown in FIG. 3. A shows the data on the connection $73_k$, B shows the data on the connection $72_k$, and C shows the data on the connection $71_k$, that is to say ahead of the selectors $34_k$ and $33_k$. The latter are activated by the signal $R_{k-1}(d)$ on the connection $76_k$, the position shown in FIG. 2 being that which corresponds to $R_{k-1}=1$. At the end of a calculation cycle, $R_{k-1}$ becomes zero for one clock period. This enables the insertion of given bits and the formation of the configurations represented by D and E.

For a cell of the order k, only the k first bits of $L_k$ have been determined, the remainder of the k−p (or k−n) bits being zeros. In accordance with the invention, the least-significant bit $h_{1k}$ of the term $v_k$ calculated is inserted into the data $L_{k-1}$ in order to form $L_k$. This insertion is controlled by the signal R and is performed so that the bit $h_{1k}$ becomes the most-significant bit of the segment $L_k$.

Analogously, the data $c_{1k}$ which has been calculated by the cell k is first of all delayed by the cell $30_k$ and is inserted into the data $v_k$ in order to form $H_k$. The data $c_{1k}$ becomes the most-significant bit of $H_k$. This situation is represented by E in FIG. 3.

These operations are repeated in each cell so that on the output of the multiplier circuit there is obtained the segment $L_p$ which is followed by the segment $H_p$, constituting the exact result of the multiplication of A (n bits) by B (p bits). The operation requires only p clock periods for delivering $L_p$ and n clock periods for delivering $H_p$ for an exact result over n+p bits. When n>p, a new operation can be initialized every n cycles. The output rate, therefore, amounts to F/n, where F is the clock frequency. The latency time, which is the period of time elapsing between the introduction of the first bit of a data and the output of the first bit of the result, amounts to p cycles if p is the number of cells.

The data A and B may be two integers. Alternatively, B may be, for example a coefficient which is smaller than unity. In that case the segment $H_p$ contains the integer part of the result and $L_p$ contains the fraction.

Two multiplier circuits as described above can be connected in series, for example in order to extend the data B from p to 2p bits.

Figure 5:
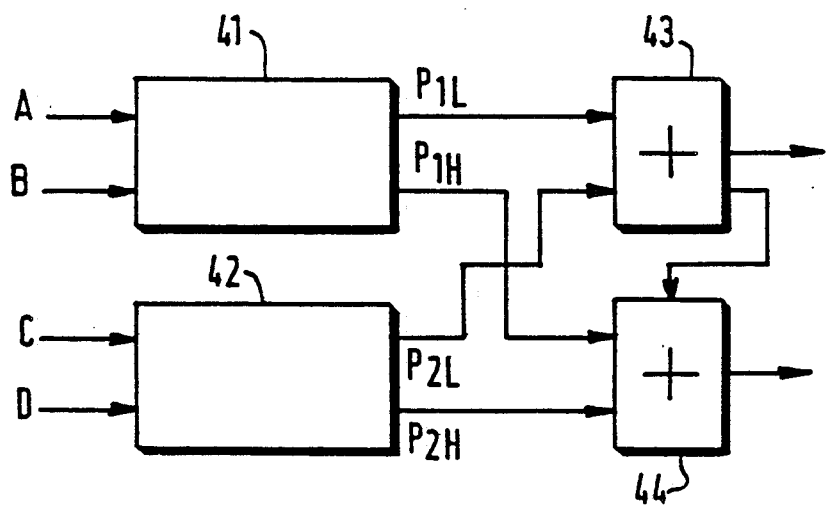
FIG. 5 is a diagram illustrating the parallel connection of two multiplier circuits in accordance with the invention in order to perform the operation (A×B) & (C×D).
Figure 5:
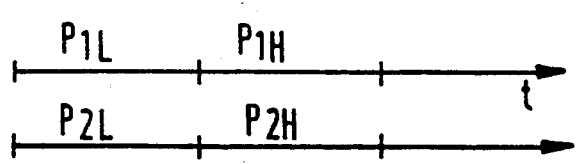

As appears from the diagram shown in FIG. 5, the two multiplier circuits 41, 42 can operate in parallel in order to perform a first multiplication A×B and a second multiplication C×D in order to obtain the result (A×B) & (C×D).

The segments L with the least-significant bits are supplied first and are added in the adder 43. Similarly, in the adder 44 the segments H with the most-significant bits are added to the carry supplied by the adder 43.

The final result is again delivered in the form of two segments of bits.

The diagram of the last cell shown in FIG. 2 relates to a multiplier circuit which cannot be cascaded with the input of an identical multiplier circuit. In order to create this possibility, it is necessary to modify the last cell in accordance with the diagram shown in FIG. 4.

The flipflops $27_p$ and $28_p$ delay the data $A_p$ and $R_p$ in the same way as the preceding cells and transmit the data to the environment. An external control signal F controls the mode of operation in order to ensure that only the last cell of the last multiplier circuit in a chain of several multiplier circuits has a particular mode of operation. The other last cells of the preceding multiplier circuits are thus controlled by F so as to operate in the same way as all other cells. To achieve this, an AND-gate 51 receives F and the bit $b_p$, and an exclusive OR-gate 52 receives F and the output signal of the flipflop $21_p$. When the signal F is logic 0, the last cell operates in a particular mode. When the signal F is logic 1, the behaviour of that cell is the same as that of all other cells.

This enables the cascading of a plurality of multiplier circuits in order to extend the number of bits of at least either the data A or B.

Thus, the $p^{th}$ cell comprises means for determining the carry $c_p$ which enters the last adder according to:

$$c_p = F.b_p.\overline{R}_{p-1}(d) + R_{p-1}(d).c_{op}(d)$$

and for performing the operation of the type: $(A \times F).b_p$, where ($\times$) represents the exclusive OR-function and F is a signal which enables control of the $p^{th}$ cell in order to obtain a cascadable multiplier circuit.

What is claimed is:

1. A pipeline-type serial multiplier circuit having a cellular structure for multiplying two synchronized streams of digital data, that is to say a stream A consisting of n bits $\{a_n \ldots a_k \ldots a_1\}$ and a stream B consisting of p bits $\{b_p \ldots b_k \ldots b_1\}$, where n, k and p are integers, by forming in each cell of the structure, in the pipeline mode, the partial products of the multiplicand A and each bit of the multiplier B, after which the partial products are successively added at a clock frequency F, each cell of the order k comprising:

an elementary one-bit adder which receives data $x_k$, $y_k$ and carries $c_k$, and which at a given instant outputs a result $v_k$ and a carry $c_{ok}$, so that $$v_k = (x_k \,\&\, y_k \,\&\, c_k) \text{ modulo } 2$$

$$c_{ok} = (x_k \,\&\, y_k \,\&\, c_k)/2$$

where $c_k$ is at a given instant equal to the carry $c_{ok}$ determined in a same cell during a previous clock period, after which the carry $c_{ok}$ is delayed so that $c_k = c_{ok}(d)$, delay means for synchronizing the data output by two successive cells, means for temporary storage of a data bit and the carry $c_{ok}$, characterized in that the multiplier circuit comprises means for delivering the exact result of the operation in first and second consecutive bit segments under control of a signal R, the first consecutive bit segment L being formed by the p bits having the lowest binary weight, the second consecutive bit segment H being formed by the n bits having the highest binary weight, the multiplier circuit having an output rate F/n, where n is an integer greater than p, which means for delivering comprise:

respective means, disposed within each cell, for receiving a signal $R_{k-1}$ from the previous cell;

means for generating, after the temporary storage, data $c_{1k}$ so that:

$$c_{1k} = (x_k \,\&\, y_k \,\&\, c_{ok}) \text{ modulo } 2,$$

the data $c_{1k}$ being delivered during the same clock period as the carry $c_{ok}$, means for determining the partial segments $L_k$ and $H_k$ supplied by each cell of order k so that $$L_k = L_{k-1}(d).R_{k-1}(d) + v_k.\overline{R}_{k-1}(d) \text{ and}$$

$$H_k = v_k.R_{k-1}(d) + c_{1k}(d).\overline{R}_{k-1}(d)$$

where $R_{k-1}(d)$ is the signal $R_{k-1}$ applied to the cell k via the preceding cells, delayed by one clock period in the cell k, means for reintroducing the carry $c_k$ in the adder of the order k under control of the signal $R_{k-1}(d)$ in accordance with $$c_k = c_{ok}(d).R_{k-1}(d), \text{ for the p-1}^{th} \text{ cells, and}$$
$$c_p = b_p.R_{p-1}(d) + R_{p-1}(d).c_{op}(d), \text{ for the pth cell,}$$

means for delaying the data $c_{1k}$ by a clock period in the $k^{th}$ cell to form $c_{1k}(d)$, and means for combining the data A and B so that all cells but the $p^{th}$ cell perform operations of type $A.b_k$ and the $p^{th}$ cell performs an operation of the type $\overline{A}.b_p$, the symbols used being (.): AND-logic; (+) OR-logic; (&): addition.

2. A multiplier circuit as claimed in claim 1, comprising n cells, the temporary storage means delaying the bits of the multiplier B in each cell.

3. A pipeline-type serial multiplier circuit as claimed in claim 2 and modified in that the $p^{th}$ cell comprises means for determining the carry $c_p$ according to:

$$c_p = F.b_p.\overline{R}_{p-1}(d) + R_{p-1}(d).c_{op}(d)$$

and for performing the operations of the type: $(A*F).b_p$, where (*) represents the exclusive-OR function and F is a signal which enables control of the $p^{th}$ cell in order to obtain a cascadable multiplier circuit.

4. A multiplier structure, characterized in that it comprises a chain of several multiplier circuits as claimed in claim 3 which are cascaded in order to extend the number of bits of at least either the data A or B.

5. A multiplier structure, characterized in that it comprises:
a parallel connection of first and second chains of multiplier circuits as claimed in claim 4, the first and second chains of multiplier circuits simultaneously supplying first and second first partial segments $L_1$ and $L_2$ and first and second second partial segments $H_1$ and $H_2$,
a first adder for adding the first and second first partial segments,
a second adder for adding the first and second second partial segments,
one of said first and second adders supplying the part corresponding to the bits of lowest binary weight while the other of the first and second adders supplies the part corresponding to the bits of the highest binary weight of the overall result.

6. A multiplier structure, characterized in that it comprises
a parallel connection of first and second multiplier circuits as claimed in claim 3, the first and second multiplier circuits having respective first and second first partial segments $L_1$ and $L_2$ and first and second second partial segments $H_1$ and $H_2$, the first and second multiplier circuits simultaneously supplying first and second first partial segments as well as first and second partial segments,
a first adder for adding the first and second first partial segments,
a second adder for adding the first and second second partial segments,
one of said adders supplying the part corresponding to the bits of lowest binary weight while the other adder supplies the part corresponding to the bits of the highest binary weight of the overall result.

7. A multiplier structure, characterized in that it comprises
a parallel connection of first and second multiplier circuits as claimed in claim 2, the first and second multiplier circuits having respective first and second first partial segments $L_1$ and $L_2$ and first and second second partial segments $H_1$ and $H_2$, the first and second multiplier circuits simultaneously supplying first and second first partial segments as well as first and second partial segments,
a first adder for adding the first and second first partial segments,
a second adder for adding the first and second second partial segments,
one of said adders supplying the part corresponding to the bits of lowest binary weight while the other adder supplies the part corresponding to the bits of the highest weight of the overall result.

8. A multiplier circuit as claimed in claim 1, characterized in that it comprises p cells, the temporary storage means delaying the bits of the multiplicand A in each cell.

9. A pipeline-type serial multiplier circuit as claimed in claim 8 and modified in that the $p^{th}$ cell comprises means for determining the carry $c_p$ according to:

$$c_p = F.b_p.\overline{R}_{p-1}(d) + R_{p-1}(d).c_{op}(d)$$

and for performing the operation of the type: $(A*F).b_p$, where (*) represents the exclusive-OR function and F is a signal which enables control of the $p^{th}$ cell in order to obtain a cascadable multiplier circuit.

10. A multiplier structure, characterized in that it comprises a chain of several multiplier circuits as claimed in claim 9 which are cascaded in order to extend the number of bits of at least either the data A or B.

11. A multiplier structure, characterized in that it comprises:
a parallel connection of first and second chains of multiplier circuits as claimed in claim 10, the first and second chains of multiplier circuits simultaneously supplying first and second first partial segments $L_1$ and $L_2$ and first and second second partial segments $H_1$ and $H_2$,
a first adder for adding the first and second first partial segments,
a second adder for adding the first and second second partial segments,
one of said first and second adders supplying the part corresponding to the bits of lowest binary weight while the other of the first and second adders supplies the part corresponding to the bits of the highest binary weight of the overall result.

12. A multiplier structure, characterized in that it comprises
a parallel connection of first and second multiplier circuits as claimed in claim 9, the first and second multiplier circuits having respective first and second first partial segments $L_1$ and $L_2$ and first and second second partial segments $H_1$ and $H_2$, the first and second multiplier circuits simultaneously supplying first and second first partial segments as well as first and second second partial segments,
a first adder for adding the first and second first partial segments,
a second adder for adding the first and second second partial segments, one of said adders supplying the part corresponding to the bits of lowest binary weight while the other adder supplies the part corresponding to the bits of the highest binary weight of the overall result.

13. A multiplier structure, characterized in that it comprises
a parallel connection of first and second multiplier circuits as claimed in claim 8, the first and second multiplier circuits having respective first and second first partial segments $L_1$ and $L_2$ and first and second second partial segments $H_1$ and $H_2$, the first and second multiplier circuits simultaneously supplying first and second first partial segments as well as first and second second partial segments,
a first adder for adding the first and second first partial segments,
a second adder for adding the first and second second partial segments,
one of said adders supplying the part corresponding to the bits of lowest binary weight while the other adder supplies the part corresponding to the bits of the highest binary weight of the overall result.

14. A pipeline-type serial multiplier circuit as claimed in claim 1 and modified in that the $p^{th}$ cell comprises means for determining the carry $c_p$ according to:

$$c_p = F.b_p.\overline{R}_{p-1}(d) + R_{p-1}(d).c_{op}(d)$$

and for performing the operation of the type: $(A \times F).b_p$, wherein $(\times)$ represents the exclusive-OR function and F is a signal which enables control of the $p^{th}$ cell in order to obtain a cascadable multiplier circuit.

15. A multiplier structure, characterized in that it comprises a chain of several multiplier circuits as claimed in claim 14 which are cascaded in order to extend the number of bits of at least either the data A or B.

16. A multiplier structure, characterized in that it comprises:
a parallel connection of first and second chains of multiplier circuits as claimed in claim 15, the first and second chains of multiplier circuits simultaneously supplying first and second first partial segments $L_1$ and $L_2$ and first and second second partial segments $H_1$ and $H_2$,
a first adder for adding the first and second first partial segments,
a second adder for adding the first and second second partial segments,
one of said first and second adders supplying the part corresponding to the bits of lowest binary weight while the other of the first and second adders supplies the part corresponding to the bits of the highest binary weight of the overall result.

17. A multiplier structure, characterized in that it comprises
a parallel connection of first and second multiplier circuits as claimed in claim 14, the first and second multiplier circuits having respective first and second first partial segments $L_1$ and $L_2$ and first and second second partial segments $H_1$ and $H_2$, the first and second multiplier circuits simultaneously supplying first and second first partial segments as well as first and second second partial segments,
a first adder for adding the first and second first partial segments,
a second adder for adding the first and second second partial segments,
one of said adders supplying the part corresponding to the bits of lowest binary weight while the other adder supplies the part corresponding to the bits of the highest binary weight of the overall result.

18. A multiplier structure, characterized in that it comprises a parallel connection of two multiplier circuits as claimed in claim 1, the two multiplier circuits simultaneously supplying their two segments $L_1$ and $L_2$ as well as their two segments $H_1$ and $H_2$, the segments $L_1$ and $L_2$ being added in a first adder, the segments $H_1$ and $H_2$ and the carry of the first adder being added in a second adder, one of said adders supplying the part corresponding to the bits of lowest binary weight while the other adder supplies the part corresponding to the bits of the highest binary weight of the overall result.

* * * * *